Figure 13:
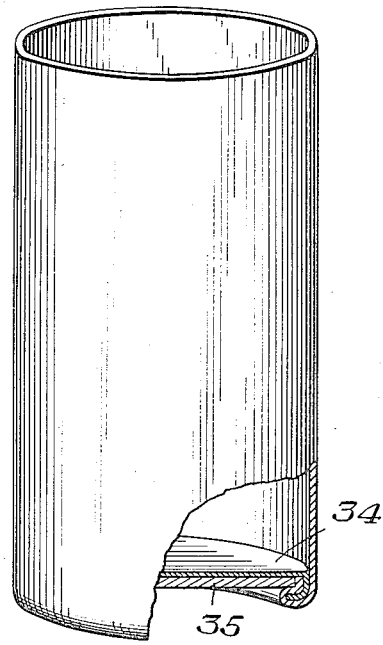

Nov. 6, 1934.  G. O. FROSTAD  1,979,827
METHOD AND APPARATUS FOR MANUFACTURING CONTAINERS
Original Filed July 25, 1929   4 Sheets-Sheet 1
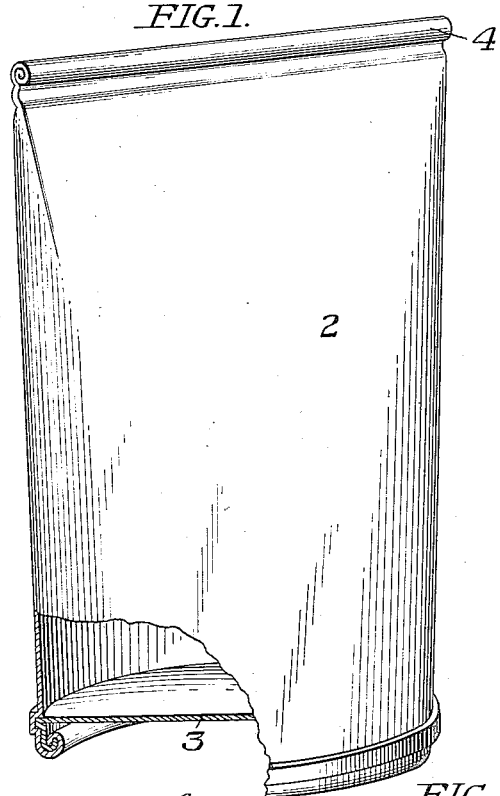
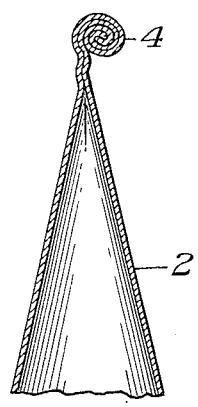
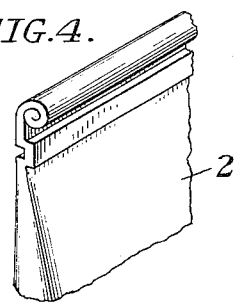
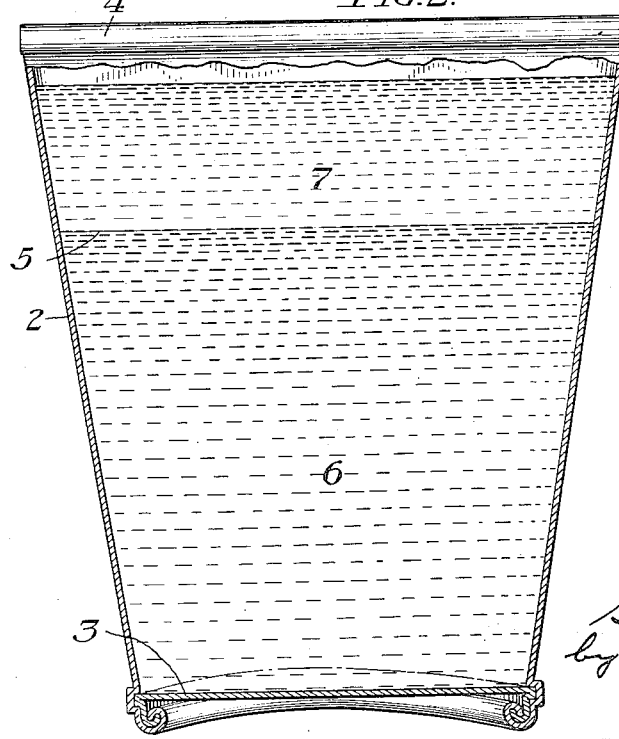
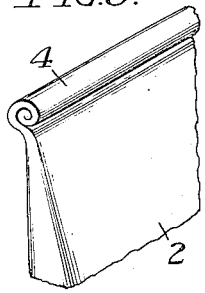
INVENTOR
George O. Frostad Nov. 6, 1934.  G. O. FROSTAD  1,979,827
METHOD AND APPARATUS FOR MANUFACTURING CONTAINERS
Original Filed July 25, 1929  4 Sheets-Sheet 2
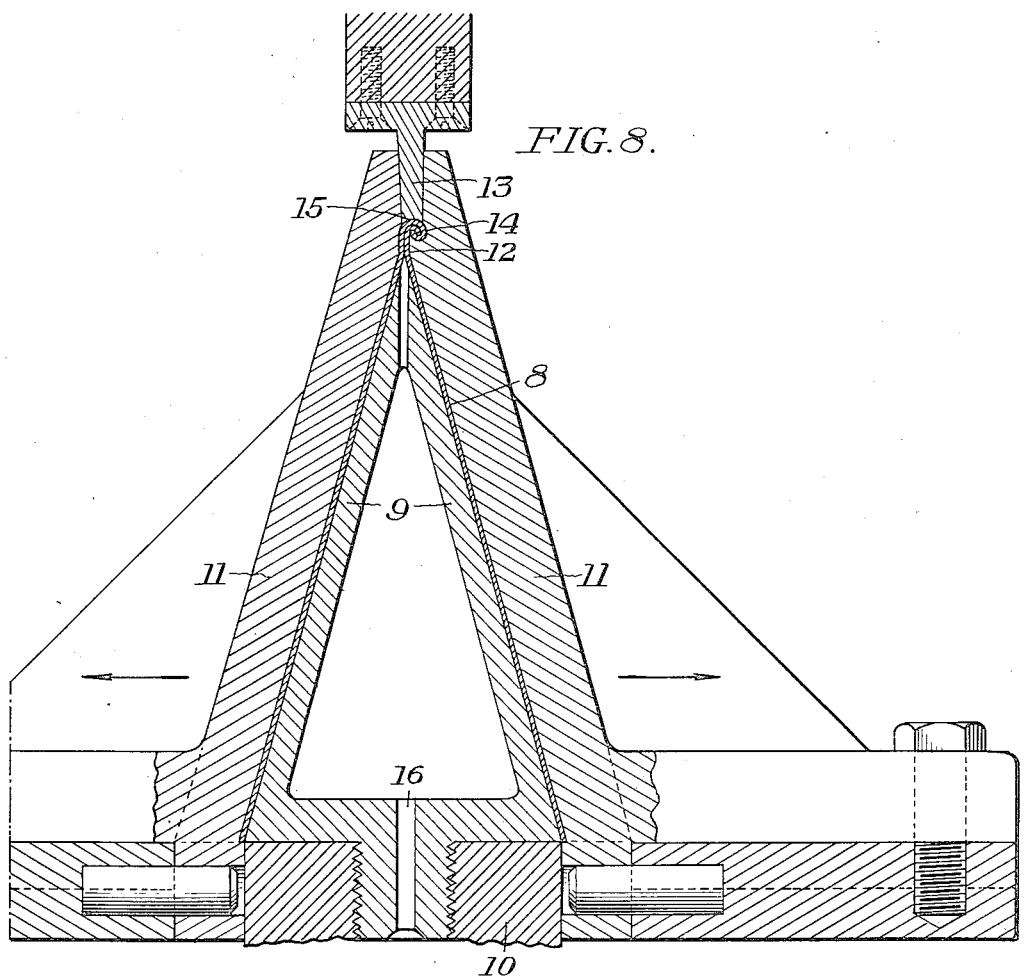
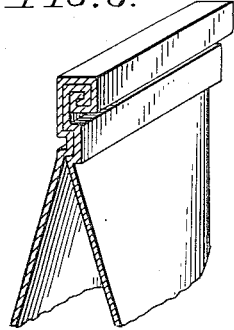
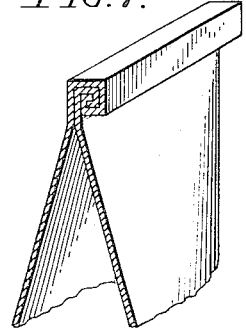
INVENTOR
George O. Frostad Nov. 6, 1934.                G. O. FROSTAD                1,979,827
METHOD AND APPARATUS FOR MANUFACTURING CONTAINERS
Original Filed July 25, 1929    4 Sheets-Sheet 3
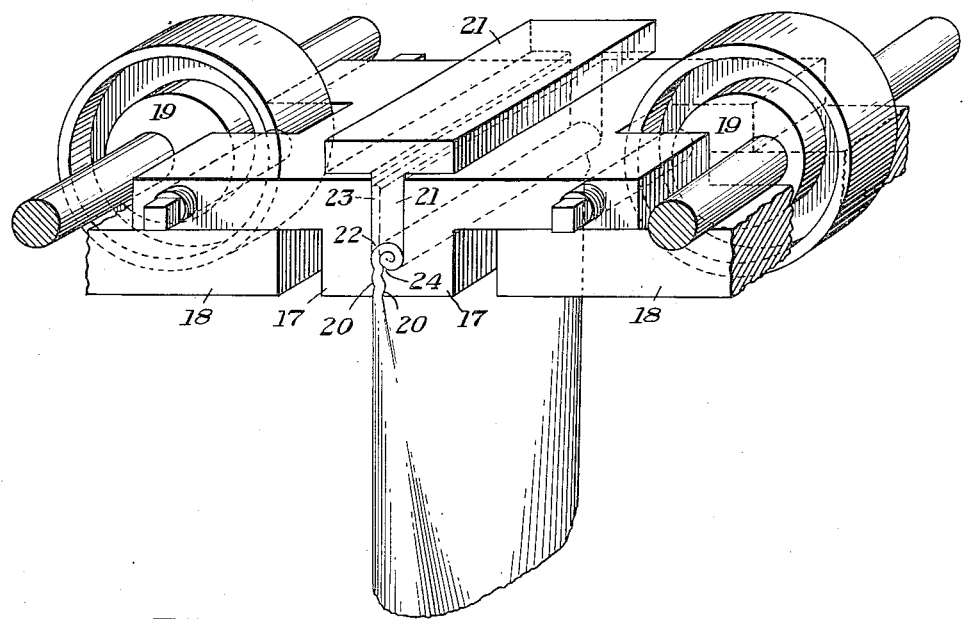
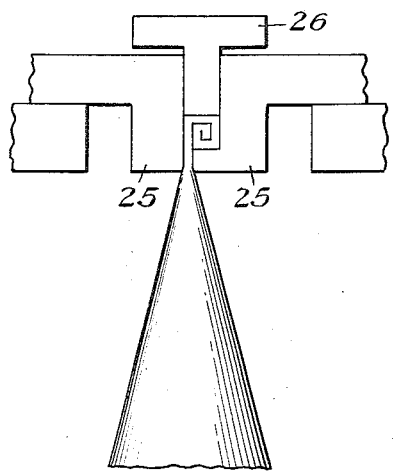
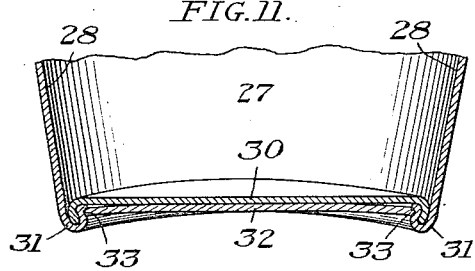
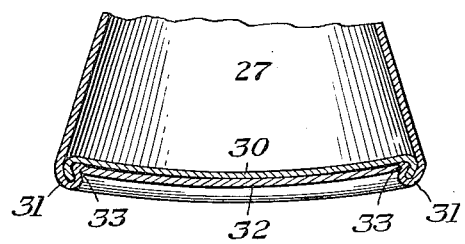
INVENTOR
George O. Frostad
by Byrnes, Stebbins, Parmelee & Lewis
his attorneys Nov. 6, 1934. G. O. FROSTAD 1,979,827
METHOD AND APPARATUS FOR MANUFACTURING CONTAINERS
Original Filed July 25, 1929 4 Sheets-Sheet 4

INVENTOR
George O. Frostad
by Byrnes, Stebbins, Parmelee & Blenko
his attorneys

Patented Nov. 6, 1934

1,979,827

UNITED STATES PATENT OFFICE 1,979,827

METHOD AND APPARATUS FOR MANUFACTURING CONTAINERS

George O. Frostad, Cudahy, Wis., assignor to National Paper Can Company, Cudahy, Wis., a corporation of Wisconsin Original application July 25, 1929, Serial No. 380,986. Divided and this application January 15, 1932, Serial No. 586,839½

22 Claims. (Cl. 93—55)

This invention relates to containers and their manufacture. It relates more particularly to a method and apparatus for manufacturing containers made of semi-flexible or workable material, such, for example, as paper or fibrous material.

The invention further relates to a method and apparatus for manufacturing containers of the type mentioned such that the containers are adapted for containing both solids and liquids, but particularly suitable for use in dispensing liquids in relatively small quantities such, for example, as milk in pints and quarts.

This application is a division of my copending application Serial No. 380,986, filed July 25, 1929, which application is in part a continuation of each of my copending applications Serial Nos. 128,006 and 297,821, filed, respectively, on August 9, 1926, and August 6, 1928, the latter of which is a division in part of the former.

Containers have heretofore been known which are made of semi-flexible or workable material and which are adapted for containing relatively small quantities of liquids. One known type of such containers is made up of a tapered body portion which is formed of a piece of material wider at one end than at the other, the opposite edges of which are glued or joined together. A bottom closure is connected with the larger end of the body and opposite wall portions at the smaller end of the body are brought together and clamped with a metal strip to complete the sealing of the container.

Containers such as that just described possess certain inherent defects and disadvantages, particularly when used for dispensing milk. In the first place there is a tendency for the milk to seep into the joint in the container body, possibly separating the connected wall portions at the joint and permitting leakage, and tending to cause pollution of the milk by the glue or binding agent.

In the second place, by reason of the fact that the size of the container body decreases from bottom to top, and also by reason of the fact that opposite wall portions are brought together at the top, the cross sectional area of the container at its upper portion where the cream tends to separate from the milk is very much less than the cross sectional area at the lower portions of the container. This fact tends to deter the separation of the cream from the milk, as cream separation is most effectively accomplished when the surface area is greatest. In other words, the effect is substantially the same as in the old type of narrow necked glass milk bottles. Some cream will find its way to the top, but on account of the reduced cross section at that portion of the container, a large percentage of cream which would separate out if the area were greater remains mixed with the milk. It is of course desirable that every opportunity be given for cream separation in order that as soon as the container is opened the cream may first be poured out in one vessel and then the milk used separately.

In the third place, the use of a metal clip for clamping the opposite portions of the container body together at the top is most undesirable. Not only does the use of such a clip necessitate special machinery for feeding the metal strip and cutting it off in the sealing of the containers, which, when considered in connection with the cost of the strip itself, greatly increases the cost of the containers, but there is also danger that the milk within the container may come in contact with the metal strip and thereby become contaminated. Considering the low cost of the container as a whole, the additional expense involved in the supply and application of a metal sealing strip is high.

Furthermore, on account of the joining of opposite portions of the container body to form the top closure, the entire body is placed under considerable stress by reason of the deformation, and portions of it removed from the top closure are warped out of their natural shape. This deformation or warping creates a tendency for the body to disengage from the bottom closure member, and consequently weakens the container and introduces a further danger of leakage.

Some of the disadvantages above noted may be to a certain extent obviated by using a container of a different shape, such, for example, as a cylindrical container. Containers of cylindrical shape have heretofore been used for dispensing milk in stores, but their usefulness would not extend to the delivery of milk in large quantities to domestic consumers. The cost and inconvenience involved in handling cylindrical containers is very great owing to the fact that only a relatively small number of such containers can be carried by a man at one time. The generally wedge shaped type of container such as above described is therefore most suitable for delivery from house to house because of the fact that a deliveryman, by placing the tops of the containers together, can carry as many as four or five in each hand without danger of dropping them. This factor is of importance because of the speed which must be exercised in delivering fresh milk early in the morning.

One of the objects of this invention is to provide a container of generally conico-wedge shape which entirely obviates all of the disadvantages above noted with respect to the known types of milk dispensing containers referred to. I provide a container, the body of which may be formed without the undesirable joint extending from top to bottom, which provides an enlarged cream separation space, which does away with the use of a metal clip for sealing the container at its top, which is effectively sealed at the bottom in spite of deformation or warping, and which is very easy to handle even in large numbers. I further provide a method of forming such containers and an apparatus for use in their manufacture which greatly reduce the ultimate cost.

I provide for the utilization of a cylindrical body blank which may, if desired, be formed out of a substantially rectangular piece of paper joined or glued together at its opposite edges, but which is preferably convolutely or spirally wound upon a mandrel. With this type of construction paraffine or other waterproofing agent may be applied after the body wall is made. The blank may be of laminar construction composed of several thin plies of wound material. Melted paraffine is preferably sprayed on the paper as it is wound, thus holding the plies together and thoroughly waterproofing the laminated body, as described, for example, in the patent to Hulbert, No. 1,380,103, granted May 31, 1921. The cylindrical laminated bodies are of stronger construction and are much more satisfactory than those formed in a single layer from a tapered blank.

The perimeter of the tapered blanks above described gradually decreases at cross sections thereof from bottom to top. Therefore, even though opposite wall portions are brought together at the top, thus decreasing one dimension and forcing the material out laterally to increase the other dimension, the greater dimension at the top of a container made up of a tapered body blank is even less than the diameter at the bottom of the container. The cross sectional area at such upper portion is so small as to be almost negligible. When, however, a cylindrical body blank is used and opposite portions thereof at the top are brought together to form a closure, the decrease in one dimension causes a corresponding increase in the other dimension, so that after the container has been closed the breadth of it at the top is considerably greater than its diameter at the bottom. This results in a very much greater cream space and also provides a larger handle or grip portion at the top of the container, greatly facilitating its carrying by the deliveryman.

I provide for joining opposite wall portions at the top of the container without the use of a separate sealing means, such as a metal strip. The sealing of the container is accomplished substantially in a single operation and may be done more quickly and much more economically than when a metal strip is applied. The top of the container presents a small portion of somewhat enlarged size which assists in grasping and holding the container. Furthermore, the danger of cutting the hand on the sharp edges of the metal strip is also done away with.

I further provide a container of the type in question having a bottom closure means comprising a closure member interengaging with the body and an auxiliary closure member cooperating therewith so as to maintain the closure in spite of the stress tending to disengage the closure means and body by reason of the deformation or warping of the latter and in spite of the tendency toward disintegration due to wetting of the inside of the closure by the contents of the container.

A number of the representative objects of the invention have been mentioned above, but other objects and advantages will become apparent as the following description of certain present preferred embodiments of the invention proceeds.

Figure 14:
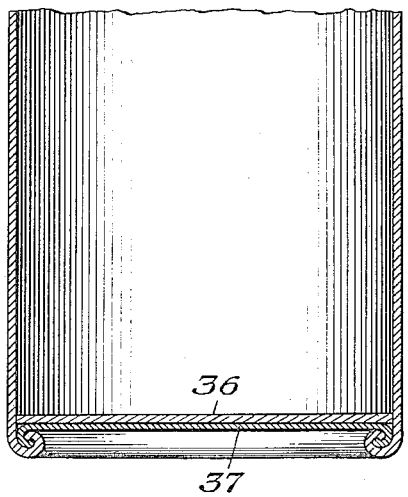
Figure 15:
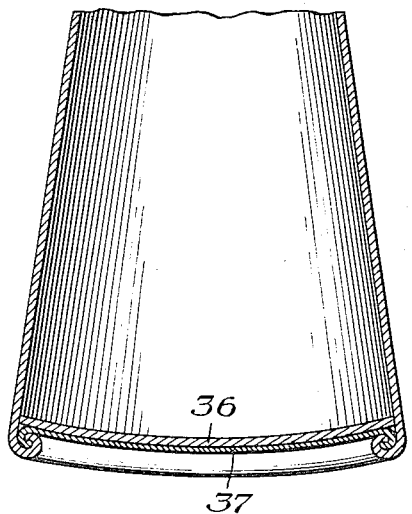
Figure 16:
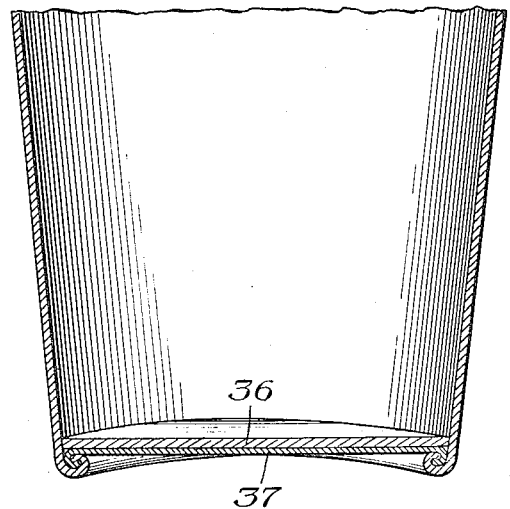

In the accompanying drawings I have shown certain present preferred embodiments of the invention, wherein, Figure 1 is a perspective view of a container with portions cut away to show its construction, Figure 2 is a vertical cross section through the container shown in Figure 1 and showing the enlarged cream separation space, Figure 3 is a vertical cross section through a portion of one form of container, Figures 4 and 5 are fragmentary perspective views of upper portions of containers, Figures 6 and 7 are fragmentary perspective views in cross section showing upper portions of two forms of container, Figure 8 is a vertical cross section through an apparatus for sealing containers, Figure 9 is a perspective view of an apparatus for sealing containers, Figure 10 is a diagrammatic view showing the sealing of a container, Figure 11 is a central vertical cross section through the bottom portion of a container, the section plane being substantially parallel to the top closure, Figure 12 is a central vertical cross section throught the bottom portion of the container shown in Figure 11, the section plane being substantially perpendicular to the top closure, Figure 13 is a perspective view partly in section of a container body having a bottom closure applied thereto but before being filled and before formation of the top closure, Figure 14 is a cross section through a portion of a container body having one type of bottom closure applied thereto but before being filled and before formation of the top closure, Figure 15 is a cross section through a portion of a container such as that shown in Figure 14 but after formation of the top closure, and Figure 16 is a cross section taken at right angles to that of Figure 15.

Referring more particularly to the drawings, there is shown in Figures 1 and 2 a container comprising a body 2, with which is connected a bottom closure 3. The body 2 is made from a substantially cylindrical blank, opposite portions of which are brought together at the top to form a top closure 4. The cylindrical blank is preferably convolutely wound upon a substantially cylindrical mandrel. By reason of the cylindrical shape of the blank, when opposite wall portions are brought together at the top to form the top closure 4, one dimension is greatly reduced and the other dimension correspondingly increased, so that the breadth of the container at the top is greater than its diameter at the bottom. Although the opposite dimension is small, yet, because of the greatly increased breadth of the container, a substantial cream separation space is provided at its upper portion. In Figure 2, the line 5 denotes the separation line between the body of milk 6 and the separated cream 7.

The bottom closure 3, as shown in Figures 1 and 2, comprises a disc, the edges of which are rolled inwardly with the extremity of the body and the body and closure beaded together. The bead supports the closure above the bottom of the container and takes the strain of the contents of the container off of the portions of the body and closure which are rolled together. This form of closure has been found generally satisfactory for most purposes, but the present preferred form, and the one which most effectively maintains the seal of the container at the bottom in spite of the stresses due to warping and deformation and in spite of the wetting of the inside of the container by the contents thereof, comprises a pair of co-operating closure members, as will be presently described. The top closure 4 is provided by rolling or turning the doubled container wall upon itself in a manner also to be presently described.

The container is preferably structurally completed substantially coincidentally with the filling of it. Before the container is filled, either the bottom closure must be connected with the container body, or the top closure must be formed. When the bottom closure is first applied, the container is filled through the top and after it has been filled the top closure is made. If it is desired to first form the top closure, the container may be inverted and filled through the bottom, after which the bottom closure may be applied.

I provide apparatus adapted for forming the top closure either before or after the container has been filled. In Figure 8 is shown an apparatus adapted for forming the top closure before filling, and in Figure 9 is shown an apparatus adapted for forming such closure after the container has been filled. Regardless, however, of whether the closure is formed before or after filling, the closure is complete entirely independently of any applied sealing means, such as the metal strip above referred to.

Referring now more particularly to Figure 8, there is shown a body blank 8 which is placed over a wedge shaped support 9, which may be carried on a movable base 10 in a can-making machine, and automatically positioned by retractable clamping jaws 11. The jaws 11 hold the container body and clamp the upper portion of the container walls at 12, while a curling die 13 is moved downwardly to form the joint. One of the clamping jaws 11 is recessed at 14 to provide for the curling of the joined edges of the body as the die 13 moves downwardly. The extremity of the die is rounded at 15 whereby to reverse the direction of the joined wall extremities and to cause them to curl into the recess 14. After the wall ends have been curled together, a slight additional pressure may be brought to bear upon them by the die 13, whereby to somewhat compress the material together to insure a liquid-tight joint.

After the closure has been formed, the head may be moved to a different position and the tip of an air line applied to an opening 16 in the bottom of the head for blowing the container off of the support. The container thus formed will be filled from the bottom and sealed by inserting a disc or flanged cap and forming a suitable closure joint.

Referring now more particularly to Figure 9, there is shown an apparatus for forming the top closure of the container, particularly after it has been filled. The container is held in the position shown by supporting means (not illustrated) and with the upper end open. The container walls are tightly pressed together by clamping jaws 17 working on stationary guides 18 and actuated by cams 19. It will be noted that the working faces 20 of the jaws 17 are corrugated to give a better clamping grip and also to provide a bead adjacent the end of the container.

Immediately above the working faces 20, the jaws 17 are cut away so as to provide space for a curling die 21. The curling die has a recessed face 22 and is adapted for reciprocation in the vertical direction. When the jaws are first clamped, the edges of the container are in an upstanding position as indicated by chain lines 23 in Figure 9. These upstanding edges are engaged by the recessed face 22 of the die 21 and rolled into a joint.

One of the clamping jaws 17 is provided with an upturned lip 24 which guides the edge portions upwardly and insures a tight curl or roll. The contour of the lip 24 on its upper portion is preferably a portion of a circle of the same radius as the completed closure roll.

The apparatus shown in Figures 8 and 9 is designed to make the simplest form of closure, wherein the joined wall extremities are curled and pressed upon themselves. In Figure 9, a small bead is shown just below the curled portions. Figure 3 shows a detail of a top closure formed substantially in this manner.

While a joint which is satisfactory for most purposes may be formed without any bead or with only a slight bead, such as is shown in Figures 3 and 9, I prefer to deform the container walls below the rolled portion to additionally strengthen the closure. This deformation may be accomplished by a downward pressure upon the top of the cointainer, producing a closure such as that shown in Figure 5, wherein the neck of the container just below the curled portion is bent sidewise. A somewhat stronger joint is shown in Figure 4, wherein a distinct bead is impressed into the container walls below the curled portion. This bead also relieves the curled portion of some of the strain incident to carrying of the container.

A still stronger closure may be made by forming the curled wall portions with sharp corners, whereby the stock is deformed to a greater extent than when the walls are merely curled. In Figure 10 is diagrammatically illustrated an apparatus for forming such a closure. The apparatus comprises clamping dies 25 having flat faces which cooperate with a vertically movable die 26 having a flat lower face. After curling, the faces of the closure are compressed by the dies 25 and 26 so that the closure finally assumes a configuration with sharp corners. Such a closure is shown in Figure 7, while in Figure 6 a similar closure but having an additional bead is shown. The closure of Figure 6 has been found in practice to be the strongest of all those herein disclosed. This is presumably because it not only has the curled portions squared off as above described, but the bead is provided below the curled and squared wall extremities, which has the advantages above noted.

The top closure may be reinforced by rivets, staples or stitching, if desired. Such means have heretofore been used in connection with folded paper bags, but when used in combination with the container herein disclosed have a still greater reinforcing effect.

Although as above stated the bottom closure shown in Figures 1 and 2 is generally satisfactory for most purposes, I have found that on account of the stresses imparted to the container body by the deformation or warping brought about by joining opposite portions of the body to form the top closure, and on account of the wetting of the inside of the container by its contents, there is a decided tendency for the container body to pull away from the bottom closure, particularly at the opposite sides thereof corresponding to the flattened faces of the container. The joining of the opposite top edges of the body pulls up the corresponding lower edges so that the bottom of the body instead of being substantially plane and circular is deformed so as to be convex outwardly in the direction transversely of the top closure. Therefore, unless the bottom closure and the container body are very intimately joined there is danger of leakage between them.

The present preferred bottom structure is shown in Figures 11, 12 and 13. In Figure 11 the container body is designated generally by reference numeral 27, opposite portions 28 and 29 thereof diverging from the bottom upwardly. This divergence is brought about by the flattening of the opposite walls of the body, the effect being substantially the same as in Figure 2. The walls of the body are interengaged with the edges of a closure disc 30 as shown at 31. The lower extremity of the body is turned inwardly and upwardly about a down-turned flange on the disc 30 so that the body terminates inwardly of the edge of the disc. A second or supplemental closure disc 32 is forced against the interengaging portions of the container and disc 30 to prevent disengagement thereof due to the natural tendency for disengagement brought about by the deformation or warping of the container body as above described. The edges of the supplemental disc 32 press outwardly against the inwardly and upwardly turned extremity of the container body and maintain such extremity in intimate contact with the flange of the disc 30. An annular depression or bead 33 is formed in the material, and the edge of the disc 32 is seated in such depression to lock the closure. The annular bead 33 being spaced from the disc 30, the edge of the disc 32 is somewhat separated from the disc 30. The discs, however, lie flat against each other at the center of the bottom so that there is a slight spring effect caused by the disc 32, which is under some tension in the horizontal direction. This effect further assists in maintaining the seal of the bottom closure.

Figure 12 is a cross-section taken at right angles to that of Figure 11, the same parts being shown. In this figure, the opposite wall portions converge from the bottom upwardly. The effect of such convergence upon the bottom closure may be seen in the figure, wherein the opposite wall extremities are pulled up above the bottom of the container. It is because of this fact that a tendency exists to disengage the body and bottom closure, and such tendency is overcome by the use of the double disc construction described.

Figure 13 shows a cylindrical body blank to which is connected a double disc bottom closure similar to that of Figures 11 and 12. The inner flanged disc 34 of Figure 13 is of thinner stock than the outer flat disc 35, the flange of the disc 34 being held within the upturned extremity of the container body and the disc 35 holding the extremity of the body against the disc 34. The disc 35 lies flat against the disc 34 throughout its entire extent instead of being sprung into place as is the disc 32 of the closure shown in Figures 11 and 12. The doubled wall extremity of Figure 13 is rolled inwardly to embrace the edge of the disc 35 thereby to insure a tight joint.

The container body as clearly shown in Figure 13 is cylindrical before the top closure is made.

Figures 14, 15 and 16 show a somewhat different form of bottom closure wherein a flat disc 36 is provided on the inside of the container, an outer flanged disc 37 having its flange embraced by the inturned extremity of the body wall. The disc 36 lies on top of the closure thus formed and when the top closure is made there is a tendency to compress the disc 36 which has the effect of more firmly pressing it against the disc 37 and consequently of strengthening the closure. This effect will be seen in Figure 15.

When a closure such as that of Figures 14, 15 and 16 is used the edge of the inner disc 36 will usually be wet by the contents of the container which will cause a slight expansion of the disc, thereby also increasing the strength of the joint. This expansion will compensate for the slight recession of the opposite portions of the container wall as shown in Figure 16 due to formation of the top closure. This type of bottom closure is particularly useful in a container for liquids.

The double bottom closure construction serves to greater advantage in a container made of a substantially cylindrical body than in one made of a tapered body. This is because the stress brought about by the deformation or warping of the bottom is greater when a cylindrical body is used than when a tapered body is used. The stress is proportionately less in the tapered body construction because the deformation of the walls is not so great. The top of the tapered body is of smaller diameter than the bottom, and the distance through which the opposite wall portions must be moved to join them together is much less. This being the case, the stress which is transmitted to the bottom portion of the tapered container is proportionately less than when a cylindrical body is used. Consequently, although the double bottom closure construction provides a much stronger container in either case, it is considerably more important when a cylindrical body blank is used.

It is also possible to wind the material upon a tapered mandrel, whereby to form a tapered body blank which would eliminate the longitudinal seam in the tapered type of container. In fact the container body blank may assume various shapes within the scope of the invention,—for instance, it may terminate in a rectangular or polygonal bottom closure, the upper extremities being brought together to form the top closure as described. When containers of considerable length are used, both ends may be closed in the manner herein described with reference to the top closure. This method would be less satisfactory on short containers than on containers whose length is, say, at least four or five times as great as the diameter of the body blank.

The preferred material of which the container is made is fibrous material or heavy paper. The terms "fibrous material" and "paper" as used in the claims include not only the usual fibrous material used in making so-called "paper cans", but also materials such as glassine paper and "cellophane". Such materials are ordinarily very thin and not self-supporting, but may be made of sufficient body to be adapted for use in the making of a "self-sustaining" container as contrasted with a thin paper wrapper. A body, which may be either a single thickness of material or of laminated construction, as above explained, and which has a thickness of from .010 to .030 inch, has been found most satisfactory, as such a body is inherently self-supporting and strong enough to sustain the seal of the container independently of metallic clips or other such reinforcing means. When the body is made up of a plurality of plies of material, a single thickness of the material need not necessarily be self-supporting of itself, but there should be enough thickness of it to form a self-supporting structure.

In forming the container it is preferable to heat the stock previous to certain operations. The container body is preferably passed through a heating chamber or in contact with heated rollers so as to bring its temperature up to approximately 100° F. which greatly increases the pliability of the stock. This increased pliability is of considerable advantage in the formation of the top closure especially on account of the sharp fold at the extremities thereof.

The body may be dipped into a bucket of water at 110° to 120° F. whereupon the opposite walls are brought together. Heat may also be applied during subsequent steps in the formation of the completed container which will assist in providing a more perfect container. An electrical heating unit may be used in the forming tools or the heat may be applied in any convenient manner.

The type of container herein disclosed is adapted for containing powders, which may be ejected through a small opening near the top of the container by periodically compressing the semi-flat sides toward each other, as one would operate a bellows. A small hole may be cut or punctured at an extremity of the top closure, whereby the container may be used for spraying bug powder, kitchen cleanser, and the like.

When the container is used for containing liquids, a hole may be made in it near the top and a drinking straw inserted, thus enabling the liquid to be drunk directly from the container. If it is desired to completely open the container, a slot may be cut in it near the top, or the top closure may be entirely severed from the body. When the latter method is used, the body may be straightened out into cylindrical form, so that its contents can be drunk as from a tumbler. This is a distinct advantage over the tapered body container, as it is very difficult to drink from a vessel of that shape.

While I have shown and described certain present preferred embodiments of the invention, it is to be distinctly understood that the same is not limited thereto but may be otherwise variously embodied and practiced within the scope of the following claims.

I claim:

1. A method of sealing an opening in a container, which includes clamping the container walls together adjacent the opening, leaving the edge portions projecting above the clamped portion, beading the united container walls at the clamped portion, and deforming the united edge portions to form a joint.

2. A method of forming a closure for a fibrous container comprising bringing together a plurality of thicknesses of the container wall, beading such thicknesses to form a tight seal, and deforming such thicknesses upon themselves to assist in maintaining the seal.

3. Apparatus for sealing an opening in a container comprising cooperating dies effective for engaging container walls and clamping the same together adjacent the opening by leaving the edge portions projecting beyond the clamped portion, the dies being effective for beading the united container walls at the clamped portion substantially parallel to the closure, and a die for rolling together the projecting edge portions.

4. Apparatus for sealing an opening in a container comprising cooperating dies for clamping the container walls together, such dies having faces formed to impress a bead in the container walls generally parallel to the closure of the container.

5. Apparatus for sealing an opening in a container comprising means for holding together the container walls and means having a curved curling surface for deforming such walls, such first-mentioned and last-mentioned means being relatively movable.

6. Apparatus for sealing an opening in a container comprising means for beading together the container walls substantially parallel to the closure and means for deforming the walls adjacent the bead to form a sealed closure.

7. A method of forming a closure for a container having walls of elastic fibrous material comprising bringing opposite walls together to form a multi-ply thickness of elastic fibrous material and rolling such thickness toward the body of the container to form a self-sustaining seal.

8. A method of forming a closure for a container of elastic fibrous material adapted to contain a liquid comprising bringing opposite walls together, clamping said walls, and rolling the projecting edge portions toward the body of the container while said walls are clamped, the closure providing a liquid-tight seal supported and sustained by the container walls.

9. A method of forming a closure for a container formed entirely of an elastic fibrous material adapted to contain a liquid comprising bringing opposite walls of the elastic fibrous material of the container together and turning and re-turning such walls upon themselves to form a liquid-tight seal capable of sustaining itself despite wetting of the container walls by the contents thereof.

10. A method of forming a closure for a container of semi-flexible material comprising bringing opposite walls of the container together to form a two-ply thickness throughout the entire area of contact of such walls, clamping the same together, and turning and re-turning such thickness against itself while said walls are clamped to form a closure of substantially uniform thickness from end to end.

11. A method of forming a closure for a fibrous container comprising bringing together a plurality of thicknesses of the container wall, beading such thicknesses substantially parallel to their line of juncture, and deforming such thicknesses upon themselves.

12. A method of forming a closure for a container of semi-flexible material comprising beading together the container walls to prevent crushing of the material and deforming the walls adjacent the beaded portions by exerting a pressure thereon toward the container body.

13. Apparatus for sealing an opening in a container comprising means for holding together the container walls and means having a curved surface arranged to be moved into engagement with the projecting portions of said walls, such first-mentioned and last-mentioned means being relatively movable.

14. Apparatus for sealing an opening in a container comprising means for holding together the container walls and means movable longitudinally of the clamped portion of the container, said longitudinally movable means having a curved surface to roll up the walls to form a sealed closure.

15. Apparatus for sealing an opening in a container comprising means for holding the container walls together and a movable die arranged on the side of the holding means toward which the projecting portions of the container walls extend, said movable die having a curved wall-engaging face for curling the walls to form a sealed closure.

16. A method of sealing an opening in a container of flexible fibrous material, which includes flattening the flexible fibrous material of the container walls and bringing together the edge portions around the opening and rolling the united edge portions together to form a joint.

17. A method of sealing an opening in a self-sustaining container, which includes flattening the container walls and clamping the container walls together adjacent the opening in the container, leaving the edge portions projecting above the clamped portion, and rolling the united edge portions together to form a joint while the container walls are clamped.

18. A method of making a paper bottle comprising forming a paper cylinder, attaching a separate paper closure to one end of the cylinder, and forming a closure at the other end of the cylinder so that the bottle is of generally wedge shape at such second mentioned end and is wider at such end than at the opposite end.

19. A method of making a container, comprising providing a body member having a periphery of equal length from end to end, applying to said body member a flat closure member to close one of its ends, and fastening together opposite portions of the material at the opposite end.

20. Apparatus for sealing an opening in a container comprising means for holding together diametrically opposite wall portions of the container and means movable relatively thereto to roll up such wall portions to form a sealed closure.

21. Apparatus for sealing an opening in a container comprising means for holding together diametrically opposite wall portions of the container and a movable die having a curved face for curling such wall portions to form a sealed closure.

22. A method of making a container, comprising providing a body having a periphery of equal length from end to end, closing one end of said body by a generally flat closure extending thereacross, and closing the opposite end of said body by fastening together opposite portions of the material thereof.

GEORGE O. FROSTAD.